United States Patent [19]

Lockwood et al.

[11] B 3,989,651

[45] Nov. 2, 1976

[54] CATALYST FOR SPRAYABLE POLYISOCYANURATE FOAM COMPOSITION

[75] Inventors: Robert J. Lockwood, East Haven; Richard H. Roess, Clinton, both of Conn.

[73] Assignee: The Upjohn Company, Kalamazoo, Mich.

[22] Filed: July 9, 1974

[21] Appl. No.: 486,828

[44] Published under the second Trial Voluntary Protest Program on March 2, 1976 as document No. B 486,828.

[52] U.S. Cl. .................. 260/2.5 AW; 260/2.5 AC; 427/244; 427/421; 428/425
[51] Int. Cl.² ................ C08G 18/14; C08G 18/18; B32B 27/40
[58] Field of Search ............. 260/2.5 AW, 77.5 NC, 260/2.5 AC

[56] References Cited
UNITED STATES PATENTS

| | | | |
|---|---|---|---|
| 2,779,689 | 1/1957 | Reis ..................................... | 260/2.5 |
| 3,487,080 | 12/1969 | Matsui et al. ............... | 260/77.5 NC |
| 3,745,133 | 7/1973 | Communale et al. ........ | 260/2.5 AW |
| 3,816,339 | 6/1974 | Raden ........................... | 260/2.5 AC |
| 3,849,349 | 11/1974 | Frisch et al. ................. | 260/2.5 AW |
| 3,892,687 | 7/1975 | Bechara et al. ............... | 260/2.5 AC |

FOREIGN PATENTS OR APPLICATIONS

| | | | |
|---|---|---|---|
| 908,337 | 10/1962 | United Kingdom .......... | 260/2.5 AW |
| 1,155,768 | 6/1969 | United Kingdom .......... | 260/2.5 AW |

*Primary Examiner*—H.S. Cockeram
*Attorney, Agent, or Firm*—James S. Rose; Denis A. Firth

[57] ABSTRACT

A novel process for the preparation of polyisocyanurate spray foams is disclosed. The catalyst combination comprises (i) N,N-dimethylcyclohexylamine, and (ii) a tetra (lower-alkyl) quaternary ammonium salt of an alkanoic acid. The use of this catalyst combination in the preparation of polyisocyanurate spray foams enables the systems to be sprayed under conditions of low ambient temperature upon cold substrates and to achieve good adhesion between the foam and substrate under such conditions. The polyisocyanurate foams produced using the novel catalyst combination of the invention are characterized by having high resistance to flame and heat distortion.

8 Claims, No Drawings

CATALYST FOR SPRAYABLE POLYISOCYANURATE FOAM COMPOSITION

BACKGROUND OF THE INVENTION

1. Field of the Invention

This invention relates to the preparation of polymer spray foams and is particularly concerned with a novel catalyst combination for the trimerization of polyisocyanates to polyisocyanurate spray foams.

2. Description of the Prior Art

Rigid polyisocyanurate foams having resistance to flame and heat as well as excellent thermal insulating capacity are known in the art. The prior art discloses methods for preparing such foams by reacting an organic polyisocyanate with a trimerizing catalyst in the presence of a blowing agent, and a minor proportion (usually less than 0.5 equivalent per equivalent of polyisocyanate) of a polyol; see for example U.S. Pat. Nos. 3,516,950, 3,580,868, 3,620,986, 3,625,872, 3,635,848, 3,725,319, 3,745,133, G.B. Pat. No. 908,337, and DBP 1,112,285.

The above methods require the foaming process to proceed in conjunction with at least two polymer forming reactions; namely, the isocyanurate formation arising from the homopolymerization of the isocyanate employed, and the minor amount of polyurethane formation arising from the reaction of a polyol with the isocyanate. Difficulties arise, particularly in commercial applications, due to the variation in relative rates of the two polymerization reactions. The polyurethane formation frequently initiates before the trimerization formation thus giving two separate rise steps in the overall foam rise profile.

These difficulties are accentuated in the case of application of polyisocyanurate foams by spray technique. Accordingly it has hitherto been necessary, when spraying foams of this type, to employ relatively warm substrate temperatures, for example at least 60°F, in order to achieve the rapid foam rise times required and to obtain proper cure and adhesion of the foam to the substrate. The result of simply increasing the concentration of catalysts of the prior art in an attempt to achieve rapid rise characteristics along with good foam cure and substrate adhesion when spraying on cold substrates, is both poor adhesion and foam cure with concomitant loss in foam properties. Because of the critical role which the nature and proportion of catalyst play in the preparation of polyisocyanurate foams, it has not hitherto been possible to devise a catalyst which would perform satisfactorily at low application temperatures and additionally give a foam which possessed good adhesion to the substrate.

We have now found a process which is free from the above difficulties and which is particularly useful in spray foam systems where the polyisocyanurate foam is to be applied at low temperatures to a cold substrate.

SUMMARY OF THE INVENTION

This invention comprises a process for the preparation of a spray foam in which the major recurring polymer unit is isocyanurate, which process comprises bringing together in the presence of a blowing agent under spray foam conditions:

a. an aromatic polyisocyanate;
b. a minor amount of polyol; and
c. a catalyst for trimerizing said polyisocyanate comprising:

i. N,N-dimethylcyclohexylamine; and
 ii. a tetra(lower-alkyl)ammonium lower-alkanoic acid salt.

The invention also comprises the cellular spray foams produced in accordance with the above process.

The term "lower alkyl" means alkyl compounds having from 1 to 8 carbon atoms, inclusive, such as methyl, ethyl, propyl, butyl, pentyl, hexyl, heptyl, octyl, and isomeric forms thereof.

The term "lower-alkanoic acid" means an alkanoic acid containing from 1 to 8 carbon atoms, inclusive, such as formic, acetic, propionic, butyric, pentanoic, hexanoic, heptanoic, octanoic, and isomeric forms thereof.

DETAILED DESCRIPTION OF THE INVENTION

As discussed above, the need to balance two different reactions, namely that leading to urethane and that leading to isocyanurate, in the preparation of polyisocyanurates makes the choice of catalyst particularly important. This is especially true in the preparation of systems for application by spray techniques.

It is an object of the present invention to prepare high temperature and fire resistant polyisocyanurate cellular polymers, particularly by spray application on a variety of substrate materials. It is a further object of the present invention to prepare polyisocyanurate spray foams possessing the aforementioned properties using standard polyurethane foam spray equipment readily available and known to the art. It is yet a further object of the present invention to be able to spray the polyisocyanurate foams at ambient and substrate temperatures below those levels considered to be normal, for example, below 60°–80°F. In still a further object of the present invention it is desired to spray the foams to achieve the aforementioned objectives without the need of resorting to higher reactant component temperatures than those generally employed in the art. In yet a further object of the present invention it is desired to prepare polyisocyanurate spray foams that cure rapidly and still possess good thermal insulation properties.

We have now found that a particular cocatalyst combination set forth herein permits the formulation of spray systems which meet the aforementioned objectives. The cocatalyst combination of the present invention provides for polyisocyanurate spray foams having excellent adhesion to a variety of substrates normally encountered in the spray foam art. Surprisingly and unexpectedly this property is maintained regardless of whether the foam is sprayed under normal ambient temperature conditions or at such low temperatures where spray foams of the prior art would not adhere to a substrate. In a further advantage to flow from the use of the cocatalyst combination of the present invention, the foams sprayed at low temperatures as referred to hereinabove, not only maintain their excellent adhesion but also maintain all other physical properties as will become evident hereinbelow.

The novel catalyst combination of the present invention comprises the ingredients set forth above. The cocatalyst components are brought together during or immediately prior to the trimerization reaction of the polyisocyanate. In an optional step the tertiary amine and quaternary salt can be premixed or stored as a mixture.

The components of the catalyst combination of the invention and the concentration ranges of said components are set forth hereinbelow in detail in the form of mole percentages. It is to be understood that the sum total of the individual mole percent concentrations chosen for each component must equal 100 mole percent. It is also to be understood that the concentration of one component can be varied within the specified ranges so long as the appropriate adjustment is made in the remaining component so that the total equals 100 mole percent. This method of indicating the proportions of the two components of the cocatalyst is adopted in defining the parameters of the cocatalyst itself. However, when particular embodiments of the use of the cocatalyst are described hereinbelow, e.g. in the preparation of a spray polyisocyanurate cellular polymer, the amounts of the components of the cocatalyst will be set forth in absolute terms.

1. The quaternary salt component of the cocatalyst system is advantageously employed in a proportion in the range of from about 15 mole percent to about 97 mole percent of the cocatalyst and, preferably in the range of from about 40 mole percent to about 85 mole percent. The salts are prepared by bringing together the appropriate alkanoic acid as defined hereinabove and represented by the formula

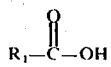

wherein $R_1$ represents hydrogen or alkyl from 1 to 7 carbon atoms, with the appropriate quaternary ammonium hydroxide of formula

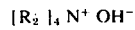

wherein $R_2$ is lower alkyl as defined above. It is understood that $R_2$ can be the same as, or different from, $R_1$. Further, the four $R_2$ residues can be the same, or independently selected from differing lower alkyl groups. Illustratively, in preparing the quaternary ammonium salts the alkanoic acid is added slowly to a methanolic solution of the quaternary hydroxide which is at a high enough temperature to cause distillation of the methanol but well below the boiling point of the acid being added. Removal of all volatiles, including by-product water, under reduced pressure yields the compound (I) as illustrated by the following equation:

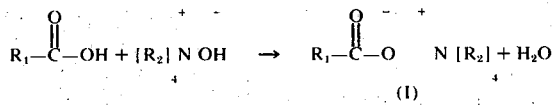

Typical examples of the starting acid include: formic acid, acetic acid, propionic acid, butyric acid, isobutyric acid, valeric acid, caproic acid, heptylic acid, caprylic acid, 2-methylhexanoic acid, 2-ethylhexanoic acid, neopentanoic acid, and the like. Typical examples of the starting quaternary ammonium hydroxide include: tetramethylammonium hydroxide, tetraethylammonium hydroxide, tetrabutylammonium hydroxide, tetraoctylammonium hydroxide, trimethylethylammonium hydroxide, tributylethylammonium hydroxide, triethylbutylammonium hydroxide, and the like. The proportions of reactants employed in preparing the compound (I) can be in a molar ratio of 1:1 but advantageously the carboxylic acid component is present in excess.

A particularly preferred class of salts of formula (I) consist of the following: tetramethylammonium acetate, tetraethylammonium acetate, tetramethylammonium propionate, tetramethylammonium octanoate, and tetramethylammonium 2-ethylhexanoate. A particularly preferred quaternary ammonium salt having the formula (I) is tetramethylammonium 2-ethylhexanoate.

The salts (I) can be isolated in solid form by drying in an oven, or vacuum oven, or by using any standard method for drying solids known to those skilled in the art and thereafter used in solid form in the cocatalyst system of the present invention. In a preferred embodiment of the invention the salts (I) are employed in the cocatalyst in combination with a diluent. The diluent can be added to the salts (I) after isolation of the latter from the reaction mixture, or, preferably, the diluent is added to the reaction mixture after all the carboxylic acid has been added and most of the methanol has been distilled overhead. After the diluent has been added the reaction mixture is heated under vacuum to insure removal of any remaining methanol and water. The resulting solution is then employed in the cocatalyst combination of the invention.

Examples of diluents for the salts (I) include low molecular weight polyols such as ethylene glycol, diethylene glycol, triethylene glycol, dipropylene glycol, dibutylene glycol, tetraethylene glycol, glycerol, the liquid polyethylene glycols such as the polyoxyethylene glycols prepared by the addition of ethylene oxide to water, ethylene glycol or diethylene glycol, and the like; Cellosolve, butyl Cellosolve, Carbitol, methyl Carbitol, butyl Carbitol, and the like; ethanolamine, diethanolamine, triethanolamine; and dipolar aprotic solvents such as dimethylformamide, dimethylacetamide, N-methylpyrrolidone, dimethyl sulfoxide, and the like, and mixtures of any of the aforesaid solvents. A particularly preferred class of diluents consists of ethylene glycol, diethylene glycol, triethylene glycol, polyethylene glycol 400, and mixtures thereof. A particularly preferred diluent is ethylene glycol. The concentration of the salt (I) dissolved in the diluent is not critical and can vary from about 20 to about 80 percent by weight. When a mixture of diluents is used the proportion by weight of one diluent to the other is advantageously from about 10 to about 90 percent by weight, and preferably from about 25 to about 75 percent by weight.

2. The tertiary amine component of the cocatalyst combination, namely, N,N-dimethylcyclohexylamine is advantageously employed in the combination in a proportion in the range of from about 3 mole percent to about 85 mole percent and, preferably from about 15 percent to about 60 mole percent.

While the catalyst combination described hereinabove specifically requires the use of two different catalyst components in combination, it is to be understood that this does not exclude the presence in the catalyst combination of additional components or agents capable of causing the trimerization of a polyisocyanate provided the two components discussed above are present.

The polyols employed in preparing polyisocyanurate foams in accordance with the present invention can include any of the polyols set forth in U.S. Pat. No. 3,745,133, incorporated herein by reference, or any of those known in the art to be useful as a minor component in the preparation of polyisocyanurate foams; see supra. Said polyols can be added separately during the trimerization of the polyisocyanate component, or can be prereacted with the polyisocyanate to form an isocyanate-terminated prepolymer which is subsequently trimerized. The polyols are advantageously employed in the range from about 0.01 equivalent to about 0.5 equivalent per equivalent of isocyanate.

The polyisocyanates employed in the preparation of polyisocyanurate foams in accordance with the present invention can be any of the organic polyisocyanates conventionally employed in the art for this purpose previously; see the art cited supra. Advantageously, in order to obtain foams having exceptionally high heat resistance and structural strength, the polyisocyanates employed in the process of the invention are polymethylene polyphenyl polyisocyanates, particularly those set forth in U.S. Pat. No. 3,745,133. In an optional embodiment the polymethylene polyphenyl polyisocyanate is one having an acidity, expressed as "% hot HCl", of less than about 0.1 percent. Various methods of reducing the acidity to such levels are known in the art. A particularly useful process is that set forth in U.S. Pat. No. 3,793,362. The latter process comprises treating the polyisocyanate with from 0.25 to 1 equivalent of monomeric epoxide for each equivalent of acid present in the polyisocyanate. A particularly preferred polymethylene polyphenyl polyisocyanate is one in which the methylenebis(phenyl isocyanate) content is from about 30 to about 85 percent by weight.

In carrying out the preparation of polyisocyanurate foams in accordance with the process of the invention, the procedures and equipment conventional in the art are employed. The proportions of cocatalyst are so chosen that, for each equivalent of polyisocyanate present in the reaction mixture, there is employed from 0.002 to 0.0315 equivalent, preferably from 0.008 to 0.016 equivalent, of said tertiary amine component, and from 0.0055 to 0.022 equivalent, preferably from 0.010 to 0.019 equivalent, of said compound (I).

Foaming agents, and other optional additives such as dispersing agents, cell stabilizers, surfactants, flame retardants, and the like, can be employed according to the teachings of the incorporated reference. A particularly preferred class of flame retardant additives are the phosphorus containing flame retardants, such as: tris(2-chloroethyl)phosphate, tris(2-chloropropyl)phosphate, tris(2,3-dibromopropyl)phosphate, tris(1,3-dichloroisopropyl)phosphate, and the like.

As set forth above, the use of the cocatalyst combination of the present invention provides for the spray application of polyisocyanurate heat and flame resistant foams. Standard foam spraying equipment well known to those skilled in the art can be used in carrying out the specific embodiments of the present invention. This includes the various types of spray guns known to those skilled in the art.

The foams made in accordance with the invention show good adhesion to a variety of substrates including masonite, building board, gypsum board, asbestos board (Transite), wood, plywood, sheet metal, and paper products such as Kraft paper and heavy cardboard. The heat and flame resistant foams prepared as described hereinabove which display such good adhesion, in addition have excellent physical properties including K factor which is well known to those skilled in the art as a measure of the thermal insulative capacity of a cellular foam (as measured by the ASTM Test Method, C-177). The foams when sprayed, cure rapidly and quickly achieve the theoretical level of polyisocyanurate content. The rapid cure also results in the sprayed foams quickly reaching their optimum physical properties. An outstanding feature of the foams sprayed in accordance with the present invention resides in their capacity to be sprayed at low temperatures hitherto impractical for spray foams of the prior art. They can be sprayed at a temperature at least as low as 4.4°C (40°F), including the substrate temperature, and still possess the same excellent adhesion and physical properties obtained when higher ambient and substrate temperatures are employed. In addition, the foams of the present invention exhibit processing behaviour similar to a simple urethane. Such behaviour allows the foams to be sprayed in thin layers and thin layer laps which heretofore has not been possible with polyisocyanurate systems without poor foam cure, weak adhesion, and poor physical properties.

Thus, the cellular products of the invention can be employed for all the purposes for which the currently produced cellular spray products are conventionally employed and are particularly suitable for applications where thermal resistance, low flame spread and low smoke generation on combustion are required. The cellular products of the invention can be employed as thermal barriers and insulating materials when sprayed on high temperature pipe lines, ovens, and storage tanks containing fluids at elevated temperatures. The foams made in accordance with the present invention also find use in cryogenic applications where insulation of pipes or tanks holding fluids at low temperatures require thermal insulation. The ability to spray foams over a wide temperature range which is inclusive of low temperatures, finds special utility when spraying foams in remote areas. The heat and flame resistant foams of the present invention are particularly useful in the construction of industrial buildings.

Non-cellular polymers can also be made in accordance with the present invention using standard techniques known to those skilled in the art but employing the cocatalyst combinations of this invention. Solid polymers are obtained by carrying out the trimerization of a polyisocyanate using the same reactants employed in the cellular polymers but in the absence of the blowing agent. The reactants can be cast, molded, coated, or otherwise deposited by methods known to those skilled in the art, to form a solid polyisocyanurate casting, molding, coating, or other form of solid polyisocyanurate. Such products find use, for example, in high temperature resistant laminates prepared from reinforcing layers of heat resistant fabric such as glass fabric, graphite fabric, and the like, and layers of polyisocyanurate of the invention.

The following preparations and examples describe the manner and process of making and using the invention and set forth the best mode contemplated by the inventors of carrying out the invention but are not to be construed as limiting.

PREPARATION 1

Tetramethylammonium 2-ethylhexanoate

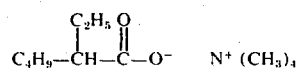

A 5 liter 3 neck flask was fitted with a thermometer, a mechanical stirrer, a distillation assembly and an addition funnel. The flask was charged with 2660 g. of a methanolic solution of tetramethylammonium hydroxide which contained 24 percent hydroxide by weight. This is equivalent to 640 g. (7 moles) of pure quaternary hydroxide. The solution was heated to approximately 80°C with constant stirring during a period of 2¾ hours. While methanol was distilling overhead, 1150 g. (8.0 moles) of 2-ethylhexanoic acid was added. While the reaction was still fluid, 1002 g. of ethylene glycol was added and during a period of about 24 hours the pressure was slowly decreased while distilling methanol and by-product water overhead at a pot temperature of 60°–70°C until the final vacuum was 2 mm. The desired product was present as approximately a 64 percent solution dissolved in ethylene glycol. This solution of tetramethylammonium 2-ethylhexanoate was used directly as a catalyst component. A crude yield of the salt was obtained when the ethylene glycol was not added but rather the reaction mixture heated until no more overhead distilled off at a pot temperature of about 80°C. Excess dioxane was added to the solid residue, cooled, then filtered to obtain the solid product which was dried overnight at 50°C. It was stored in a vacuum desiccator until used as a cocatalyst component.

PREPARATIONS 2–5

Using the procedure of Preparation 1 and substituting the carboxylic acids and quaternary ammonium hydroxides set forth in the following Table I, the corresponding salts were obtained as listed therein. In these preparations only a slight excess of acid was used and approximately 140 g. of ethylene glycol was added. The salts are characterized by the percent by weight of solvent (ethylene glycol) content. The solid products were easily obtained as crude yields of salt by simply heating the reaction mixtures in vacuo in the absence of ethylene glycol. Both forms of the salts were employed in catalyst combinations of the present invention.

TABLE I

| Prep. | Carboxylic Acid (1.1 mole) | Quaternary Hydroxide (1.0 mole) | Product | Solvent % (by wt.) |
|---|---|---|---|---|
| 2 | acetic | tetramethylammonium | tetramethylammonium acetate | 51 |
| 3 | propionic | tetramethylammonium | tetramethylammonium propionate | 49 |
| 4 | octanoic | tetramethylammonium | tetramethylammonium octanoate | 30 |
| 5 | acetic | tetraethylammonium | tetraethylammonium acetate | 42 |

EXAMPLE 1

Foam A is an example of a spray foam made in accordance with the invention using a Gusmer, Model FF Proportioner and the gun a Gusmer Model D. At a 1:1 by volume spray ratio the A and B component pressures were 600–700 psi and 300–400 psi respectively. Both sides employed Gusmer Proportioning Pumps No. 450-60 with equal component temperatures of 63°–66°C. Spray runs were made on cardboard and sheet steel with excellent adhesion in both cases. The A component was a polymethylene polyphenyl isocyanate containing about 40 precent by weight of methylenebis(phenylisocyanate) the remainder of said mixture being polymethylene polyphenyl isocyanates of functionality higher than 2.0 and having an isocyanate equivalent weight of about 140. The B component consisted of a minor amount of a polyol, a surfactant, a blowing agent, and a catalyst combination according to the present invention. The formulation and properties are set forth in Table II. The percent trimer content of Foam A as determined by infrared analysis was measured as 8.5 percent. The calculated trimer content is 8.12 percent.

TABLE II

| Foam | A |
|---|---|
| Ingredients: | |
| Component A: | |
| Polyisocyanate | 134 |
| Component B: | |
| Polyester I[1] | 65 |
| LA-700[2] | 16 |
| Tris($\beta$-chloropropyl)phosphate | 18 |
| Catalyst I[3] | 5 |
| N,N-dimethylcyclohexylamine | 2 |
| DC-193[4] | 3 |
| Freon 11-B[5] | 36 |
| Volume ratio A/B | 1:1 |
| Wt. ratio A/B | 0.92:1 |
| Rise characteristics (in seconds): | |
| Cream | Instant |
| Initiation, 1st | 0.5 |
| 2nd | 4.0 |
| Gel | 3.5 |
| Final Rise | 7 |
| Tack Free | 5 |
| Firm | 15 |
| Density, pcf | 2.1 |
| Closed Cells, % (ASTM Test D-1940) | 94.4 |
| K-Factor, BTU-in/hr.ft²°F (ASTM Test C-177) | 0.124 |
| Flame Penetration, hr./in. (Bureau of Mines Test) | 0.38 |
| Friability (% wt. loss by ASTM D-421 Test) | 2.1 |
| Humid Age, % $\Delta$ Volume at 158° F, 100% R.H.: | |
| 1 day | 4.2 |
| 7 days | 6.3 |
| 14 days | 9.0 |
| Dry Age, % $\Delta$ Volume at 200° F: | |
| 1 day | 2.1 |
| 7 days | 4.5 |
| Compressive str. (psi) | |
| $\parallel$ to rise | 28.5 |
| $\perp$ to rise | 21.7 |
| Oxygen Index (%)[6] | 29 |
| Smoke Density (%)[7] | 32 |
| Flame spread rating (FSR) and smoke according to ASTM E-84[8]: | |
| FSR | 20.5 |
| Smoke | 140 |

Footnotes to Table II
[1]Polyester I: The polyester obtained by esterifying 1 mole of chlorendic anhydride with 1.1 moles of diethylene glycol and 2.5 moles of propylene oxide.
[2]LA-700: Union Carbide polyether for rigid foams, average Hydroxyl Number=700, see "Chemicals and Plastics Physical Properties", Union Carbide, p. 22, 1969 Edition.
[3]Catalyst I: A solution consisting of 60 percent by weight of tetramethylammonium 2-ethylhexanoate and 40 percent by weight of ethylene glycol.
[4]DC-193: A silicone surfactant sold by Dow Corning Corp.; see, "Dow Corning 193 Surfactant", Bulletin: 05-146, February, 1966.
[5]Freon 11-B: Trichlorofluromethane, product of DuPont Corporation.
[6]Flammability test conducted according to the ASTM D-2863 procedure and reported as the percent oxygen content required to sustain sample combustion.
[7]ASTM D-2843-70: Method of measuring smoke density from the burning of plastics, measured as percent light absorption.
[8]ASTM E-84 (FSR): Flame spread and smoke rating of a sample as determined in accordance with the ASTM E-84 Tunnel Test.

EXAMPLE 2

Foam B was prepared in accordance with the present invention using the same polyisocyanate and identical spray equipment as outlined in Example 1. The foam was sprayed on transite and showed the same good adhesion properties as found for Foam A. Foam C was prepared using the same formulation as Foam B except that the tertiary amine component of the catalyst combination of the invention was deleted. When this foam was sprayed on transite it had the same rapid initiation as Foam B along with the same rapid rise characteristics. The rise characteristics were virtually identical to Foam A of Example 1. In contrast to Foam B however, Foam C showed very poor adhesion to the transite and in fact fell off the board. The data for Foam B and C are presented in Table III.

TABLE III

| Foam | B | C |
|---|---|---|
| Ingredients: | | |
| Component A: | | |
| Polyisocyanate | 134 | 134 |
| Component B: | | |
| Polyester I | 70 | 70 |
| Tris (β-chloroethyl) phosphate | 26 | 26 |
| Catalyst II[1] | 4 | 5 |
| N,N-dimethylcyclohexylamine | 1 | — |
| DC-193 | 3 | 3 |
| Freon 11-B | 37 | 38 |
| Volume Ratio A/B | 1:1 | 1:1 |
| Rise Characteristics (in seconds): | | |
| Initiation, 1st | | 0.75 |
| 2nd | | 3 |
| Gel | | 4 |
| Final Rise | | 7.5 |
| Tack Free | | 4.5 |
| Firm | | 10 – 15 |
| Adhesion to transite: | Excellent | Falls off |

Footnote to Table III
[1]Catalyst II: A solution consisting of 65 percent by weight of tetramethylammonium 2-ethylhexanoate and 35 percent by weight of ethylene glycol.

EXAMPLE 3

Foams D and E of the present example were both prepared in accordance with the present invention and were identical in formulation, employing the same polyisocyanate and procedures as set forth in Example 1. Foam D, however was sprayed at ambient temperature (21°C), while Foam E was sprayed at 4.4°C. Not only were the atmospheric temperatures at the two values stated but the substrates in each case were also at the same temperature values. The spray tests for each of Foams D and E were carried out on both cardboard and sheet steel as the substrate. Excellent foam adhesion was observed for both Foams D and E. The formulations and foam physical properties are set forth in Table IV and clearly show no loss in properties for Foam E sprayed at the very low temperature of 4.4°C.

TABLE IV

| Foam | D | E |
|---|---|---|
| Ingredients: | | |
| Component A: | | |
| Polyisocyanate | 134 | 134 |
| Component B: | | |
| Polyester I | 65 | 65 |
| LA-700 | 16 | 16 |
| Tris(β-chloropropyl) phosphate | 18 | 18 |
| Catalyst I[1] | 6.5 | 6.5 |
| N,N-dimethylcyclohexylamine | 2 | 2 |
| DC-193 | 3 | 3 |
| Freon 11-B | 37 | 37 |
| Component temp. (°C) | 65.5 | 65.5 |
| Ambient temp. (°C) | 21.1 | 4.4 |
| Volume Ratio A/B | 1:1 | 1:1 |
| Density, pcf | 2.04 | 1.95 |
| Humid Age, % Δ Volume at 158°F, 100% R.H.: | | |

TABLE IV-continued

| Foam | D | E |
|---|---|---|
| 1 day | 4.6 | 2.9 |
| 3 days | 6.2 | 4.0 |
| 7 days | 7.4 | 5.0 |
| 14 days | 8.3 | 6.1 |
| Dry Age, % Δ Volume at 200°F: | | |
| 1 day | 0.5 | –1.0 |
| 7 days | 2.5 | 0.8 |
| Compressive str. (psi) | | |
| ∥ Y dir. | 24.0 | 26.3 |
| ⊥ X dir. | 14.7 | 17.9 |
| ⊥ Z dir. | 17.1 | 17.4 |
| Oxygen Index | 28.9 | 29.1 |
| Smoke Density | 33 | 33 |

[1]See Example 1.

We claim:
1. A process for the preparation of a composition capable of being sprayed to form a foam in which the major recurring polymer unit is isocyanurate, which process comprises bringing together in the presence of a blowing agent under spray foam conditions:
   a. an aromatic polyisocyanate;
   b. a minor amount of polyol; and
   c. a catalyst for trimerizing said polyisocyanate comprising:
      i. from about 0.002 to about 0.0315 equivalent per equivalent of said polyisocyanate of N,N-dimethylcyclohexylamine; and
      ii. from about 0.0055 to about 0.022 equivalent per equivalent of said polyisocyanate of a tetra (lower-alkyl) ammonium lower alkanoic acid salt selected from the group consisting of tetramethylammonium acetate, tetraethylammonium acetate, tetramethylammonium propionate, tetramethylammonium octanoate, and tetramethylammonium 2-ethylhexanoate.
2. A process according to claim 1 wherein the polyisocyanate is polymethylene polyphenyl isocyanate containing from about 30 to about 85 percent by weight of methylenebis (phenyl isocyanate).
3. A process according to claim 1 wherein the ammonium salt is tetramethylammonium 2-ethylhexanoate.
4. A process according to claim 1 wherein the ammonium salt is present in the form of a solution containing from about 20 to about 80 percent by weight of salt in a diluent.
5. A process for the preparation of a composition capable of being sprayed to form a foam in which the major recurring polymer unit is isocyanurate, which process comprises bringing together in the presence of a blowing agent under spray foam conditions:
   a. an aromatic polyisocyanate;
   b. a minor amount of polyol; and
   c. a catalyst comprising:
      i. from about 0.002 to about 0.0315 equivalent per equivalent of said polyisocyanate of N,N-dimethylcyclohexylamine; and
      ii. from about 0.0055 to about 0.022 equivalent per equivalent of said polyisocyanate of tetramethylammonium 2-ethylhexanoate.
6. A process according to claim 5 wherein the polyisocyanate is polymethylene polyphenyl isocyanate containing from about 30 to about 85 percent by weight of methylenebis (phenyl isocyanate).
7. A process according to claim 5 wherein said ammonium salt is present in the form of a solution containing from about 20 to about 80 percent by weight of salt in a diluent.
8. A process according to claim 7 wherein said diluent is ethylene glycol.

* * * * *